Sept. 25, 1951   J. G. QUETSCH, JR., ET AL   2,569,195
METHOD OF INSPECTING WIRE DRAWING DIE CONTOURS
Filed April 2, 1948
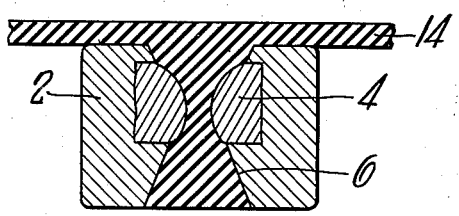
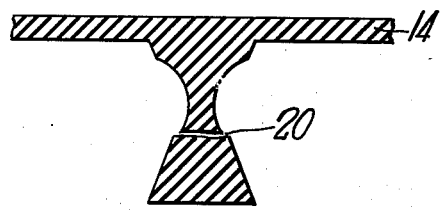
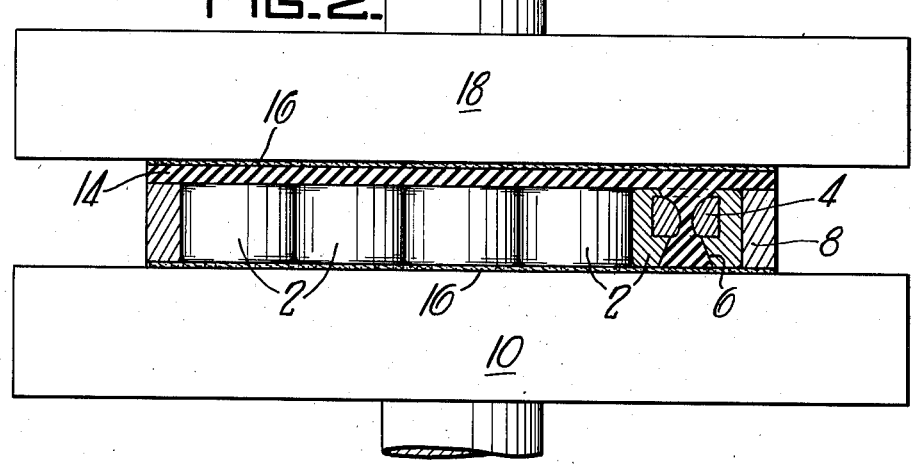
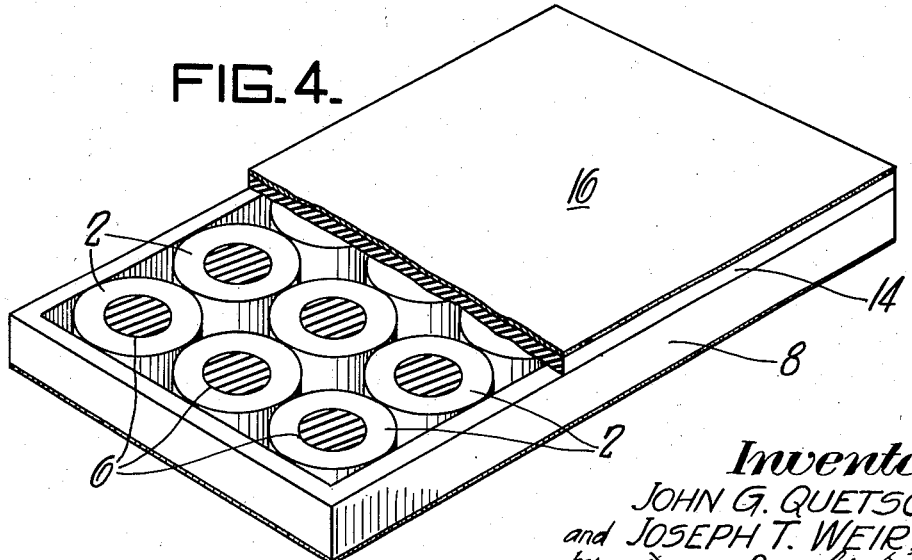
Inventors:
JOHN G. QUETSCH, JR.
and JOSEPH T. WEIR,
by: Donald G. Dalton
their Attorney.

UNITED STATES PATENT OFFICE 2,569,195

METHOD OF INSPECTING WIRE-DRAWING DIE CONTOURS

John G. Quetsch, Jr., Garfield Heights, and Joseph T. Weir, Cleveland, Ohio, assignors to The American Steel and Wire Company of New Jersey, a corporation of New Jersey Application April 2, 1948, Serial No. 18,634

3 Claims. (Cl. 18—55)

This invention relates to a method of inspecting wire drawing die contours and more particularly to such a method for inspecting small sizes of diamond dies. In order to obtain close control over the production of dies, it is necessary to be able to inspect the interior thereof. For tungsten carbide dies, reflected light inspection methods are satisfactory, but these same methods are not available for diamond dies since diamonds, which are translucent, do not reflect light. Other methods, which are reasonably acceptable, are also available for inspecting large dies, but these methods are not satisfactory for inspecting small dies, especially dies having a diameter of less than .010 inch.

It is therefore an object of our invention to provide a method of inspecting wire drawing die contours which is peculiarly adapted for small diamond dies.

Another object is to provide a method of obtaining the impressions of several dies at the same time.

These and other objects will be more apparent after referring to the following specification and attached drawings in which:

Figure 1 is a sectional view showing a die with the die impression therein;

Figure 2 is a view, partly in section, of the apparatus used in carrying out our invention;

Figure 3 is a sectional view of the impression of one die; and

Figure 4 is a perspective view, with parts broken away, of the dies positioned in a frame after the die impressions have been formed.

Referring more particularly to the drawings the reference numeral 2 indicates a wire drawing die having a diamond insert 4 therein and an axial opening 6 of the desired contour extending therethrough. In performing our method, a metal frame 8, having an open top and bottom is placed on the bottom heating platen 10 of a press. A plurality of dies 2 are then placed in the frame 8 in side-by-side relationship with the entrance side of the die preferably facing upwardly. A small piece of raw rubber is then placed in the die opening 6 and at least one sheet of raw rubber 14 is placed on top of the frame 8. In order to provide sufficient rubber to fill the die opening, it is preferable to use a plurality of sheets of rubber. To prevent the rubber from sticking to the heating platens, a piece of Holland paper 16 is preferably placed on the bottom of the frame 8 adjacent the platen 10 and a similar piece of Holland paper 16 is placed over the sheets 14 adjacent the top heating platen 18. Instead of placing the frame on the platen, it can be placed on the Holland paper outside the press and the parts assembled as above, after which the parts are held together by Scotch tape or the like for ease of handling. The assembly is then placed between the platens 10 and 18. Heat is applied to the platens 10 and 18, which are then brought together under pressure. Preferably, a temperature of 290° F. and a pressure of approximately 530 pounds per square inch is applied for 4 minutes, thus causing the rubber to flow into contact with the sides of the die cavities to form impressions thereof as shown in Figures 1 and 2. All identifying marks on the dies are also impressed in the rubber. After cooling, the rubber is pulled from the dies with the rubber in the dies fracturing at 20 as seen in Figure 3. All of the die impressions will be secured to the rubber sheet 14 and may be retained in this manner or cut into individual die impressions as desired. If more than one sheet of rubber is used initially, the sheets will be united after heat and pressure are applied. The die contours thus obtained are then examined as by means of a comparascope which affords a magnification of 30 diameters.

While one embodiment of our invention has been shown and described, it will be apparent that other adaptations and modifications may be made without departing from the scope of the following claims.

We claim:

1. The method of inspecting the die hole of a wire drawing die, said die hole having a central constricted small diameter portion between outwardly tapered portions, said method comprising placing a plurality of dies in a frame side by side with their entrance ends all facing in the same direction, covering the entrance ends of said dies in said frame with at least one sheet of uncured rubber, said rubber sheet being of sufficient dimension to cover all the dies, heating the prepared frame and applying pressure thereto to cause said rubber to flow into and through the small diameter portions of the die holes in contact with the sides of said holes to form impressions of the die holes, and then pulling the sheet of rubber to cause fracture of the rubber within each die hole adjacent the exit end thereof and removal of the sheet with the impressions of the entrance end and constricted portion of the dies attached thereto.

2. The method of inspecting the die hole of a wire drawing die, said die hole having a central constricted small diameter portion between outwardly tapered portions, said method comprising placing a plurality of dies in a frame side by side with their entrance ends up, covering the entrance ends of said dies in said frame with at least one sheet of uncured rubber, said rubber sheet being of sufficient dimension to cover all the dies, placing the prepared frame between the heating platens of a press with a strip of Holland paper adjacent each platen, applying heat to the platens and bringing them together to cause the rubber to flow into and through the small diameter portions of the die holes in contact with the sides of said holes to form impressions of the die holes, and then pulling the sheet of rubber to cause fracture of the rubber within each die hole adjacent the exit end thereof and removal of the sheet with the impressions of the entrance end and constricted portion of the dies attached thereto.

3. The method of inspecting the die hole of a wire drawing die, said die hole having a central constricted small diameter portion between outwardly tapered portions, said method comprising placing a plurality of dies in a frame side by side with their entrance ends all facing in the same direction, placing uncured rubber in each die hole, covering the entrance ends of said dies in said frame with at least one sheet of uncured rubber, said rubber sheet being of sufficient dimension to cover all the dies, placing the prepared frame between the heating platens of a press, applying heat to the platens and bringing them together to cause the rubber to flow into and through the small diameter portions of the die holes in contact with the sides of said holes to form impressions of the die holes, and then pulling the sheet of rubber to cause fracture of the rubber within each die hole adjacent the exit end thereof and removal of the sheet with the impressions of the entrance end and constricted portion of the dies attached thereto.

JOHN G. QUETSCH, JR.
JOSEPH T. WEIR.

REFERENCES CITED

The following references are of record in the file of this patent:

UNITED STATES PATENTS

| Number | Name | Date |
| --- | --- | --- |
| 1,177,902 | Schweinert et al. | Apr. 4, 1916 |
| 1,209,358 | Terkelsen | Dec. 19, 1916 |
| 1,773,377 | Roberts | Aug. 19, 1930 |
| 1,890,968 | Carter | Dec. 13, 1932 |
| 1,932,548 | Ingwer | Oct. 31, 1933 |
| 2,072,349 | Wayne | Mar. 2, 1937 |
| 2,254,233 | Meyer | Sept. 2, 1941 |
| 2,435,657 | Saviers | Feb. 10, 1948 |